No. 718,513. PATENTED JAN. 13, 1903.
F. R. PACKHAM.
BEARING FOR DISK FURROW OPENERS OF GRAIN DRILLS.
APPLICATION FILED SEPT. 2, 1902.
NO MODEL. 2 SHEETS—SHEET 1.
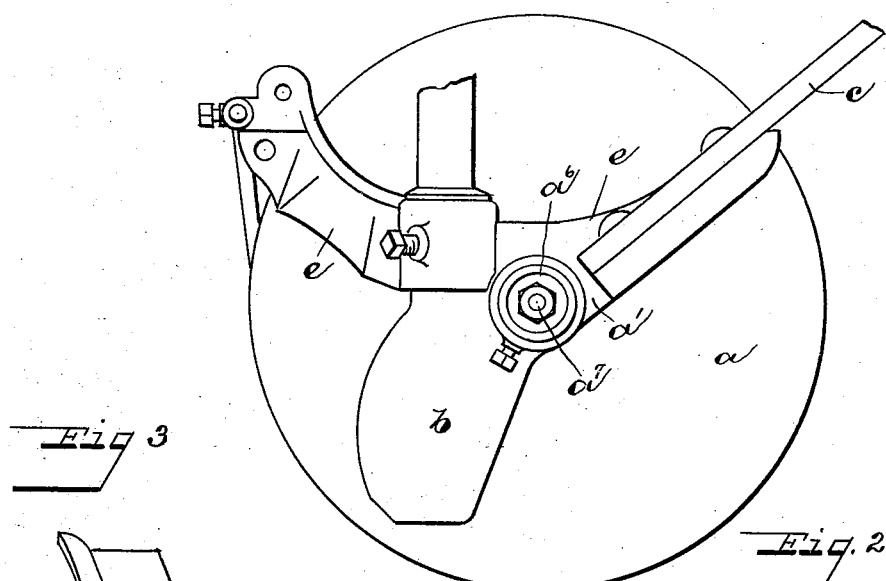
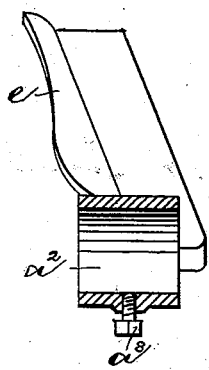
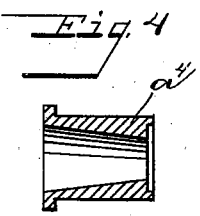
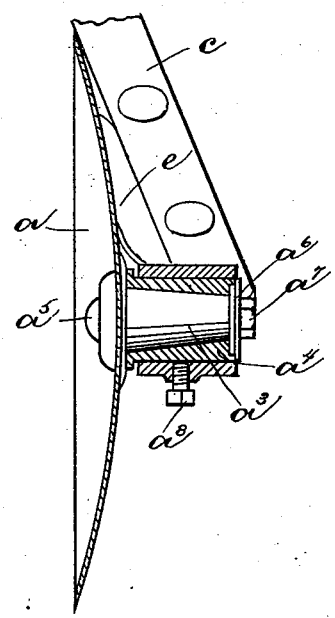
WITNESSES:
F. L. Walker
Clifton P. Grant
INVENTOR
Frank R. Packham
BY Staley & Bowman
ATTORNEYS No. 718,513. PATENTED JAN. 13, 1903.
F. R. PACKHAM.
BEARING FOR DISK FURROW OPENERS OF GRAIN DRILLS.
APPLICATION FILED SEPT. 2, 1902.
NO MODEL.
2 SHEETS—SHEET 2.
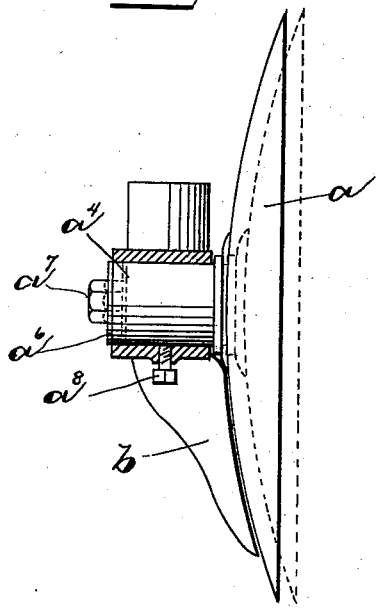
WITNESSES:
F. L. Walker
Clifton P. Grant
INVENTOR
Frank R. Packham
BY
Staley & Bowman
ATTORNEYS

UNITED STATES PATENT OFFICE.

FRANK R. PACKHAM, OF SPRINGFIELD, OHIO, ASSIGNOR TO THE SUPERIOR DRILL COMPANY, OF SPRINGFIELD, OHIO, A CORPORATION OF OHIO.

BEARING FOR DISK FURROW-OPENERS OF GRAIN-DRILLS.

SPECIFICATION forming part of Letters Patent No. 718,513, dated January 13, 1903.

Application filed September 2, 1902. Serial No. 121,727. (No model.)

*To all whom it may concern:*

Be it known that I, FRANK R. PACKHAM, a citizen of the United States, residing at Springfield, in the county of Clark and State of Ohio, have invented certain new and useful Improvements in Bearings for Disk Furrow-Openers of Grain-Drills, of which the following is a specification.

My invention relates to an improvement in bearings for disk furrow-openers for grain-drills.

The object of my invention is to provide adequate means for adjustment of parts of the furrow-opener and to construct a disk furrow-opener the parts of which can be assembled quickly and easily, permitting the parts to be shipped intact in an improved manner.

In the drawings, Figure 1 is an elevation view of the furrow-opener. Fig. 2 is a sectional view of the bearing. Figs. 3 and 4 are detail views of parts of the bearings, and Fig. 5 illustrates by plain and broken lines the adjustment of the frame and shield to the disk.

Like letters of reference indicate like parts throughout the several views.

In said drawings, $a$ indicates the disk; $b$, the shield; $c$, the drag-bar, and $e$ the scraper. The frame or support is indicated by $a'$, and said support is formed with an opening $a^2$ therein, which is formed substantially cylindrical. The spindle $a^3$ is riveted to the disk $a$. The bushing $a^4$ is formed with a tapered inner opening adapted to fit over the spindle $a^3$, as shown in Fig. 2. Said bushing has only its inner part chill-hardened. The bolt $a^5$, with the washer $a^6$ and nut $a^7$, holds the parts securely together. These parts can now be shipped intact while separated entirely from the support or frame.

The parts can be assembled quickly and easily by fitting the bushing $a^4$ within the opening $a^2$, and when the shield $b$ and scraper $e$, formed integral with said support, are adjusted laterally and relatively to the convex or non-working side of the disk, they can be held securely in proper position by the set-screw $a^8$.

In devices of this character it is very important to have adequate means of adjusting the shield and scraper laterally, for the reason that the efficiency of the work done by these devices depends upon the parts being held in close proximity to the disk; but after the furrow-opener has been in use for a season the wear in the parts caused mostly by impingement of grit between the inner edge of the scraper and shield renders them inefficient for the purpose intended. The parts are usually made of a non-yielding material, such as cast-iron. Consequently it is impossible to remedy this defect by bending the shield or scraper.

By my improved construction of bearing having the bushing with its outer diameter formed to fit the opening in the support and its screw $a^8$ formed to hold the bushing within the opening the greatest efficiency in their work is obtained.

Having thus described my invention, I claim—

1. The combination with the disk and a frame having a shield, of a bearing between said disk and frame adapted to adjust said shield in its relation to said disk, and means to fix same in its adjusted position, substantially as specified.

2. The combination with the disk, a spindle for said disk, a frame, a shield on said frame, said frame having an opening therein, of a bushing, forming a bearing for said spindle, adapted to fit in said opening, on which said frame is adapted to slide to adjust the relation of said shield to said disk, and means to fix said shield in its adjusted position, substantially as specified.

3. The combination with the disk and a frame having a shield and a scraper thereon, of a bearing between said disk and frame adapted to adjust said shield and scraper in their relation to said disk, and means to fix same in their adjusted positions, substantially as specified.

4. The combination with the disk, a spindle for said disk, a frame, a shield and a scraper on said frame, said frame having an opening therein, of a bushing, forming a bearing for said spindle, adapted to fit in said opening, on which said frame is adapted to slide to adjust the relation of said shield and scraper to said disk, and means to fix said shield and scraper in their adjusted positions, substantially as specified.

In testimony whereof I have hereunto set my hand this 16th day of August, A. D. 1902.

FRANK R. PACKHAM.

Witnesses:
    LUTHER F. BUCHWALTER,
    LE ROY HERRON.